Dec. 31, 1957 G. NATTA 2,818,413
CONTINUOUS PROCESS FOR THE PRODUCTION OF FURFURAL AND
ACETIC ACID FROM VEGETATIVE MATERIAL
Filed July 21, 1954 2 Sheets-Sheet 1
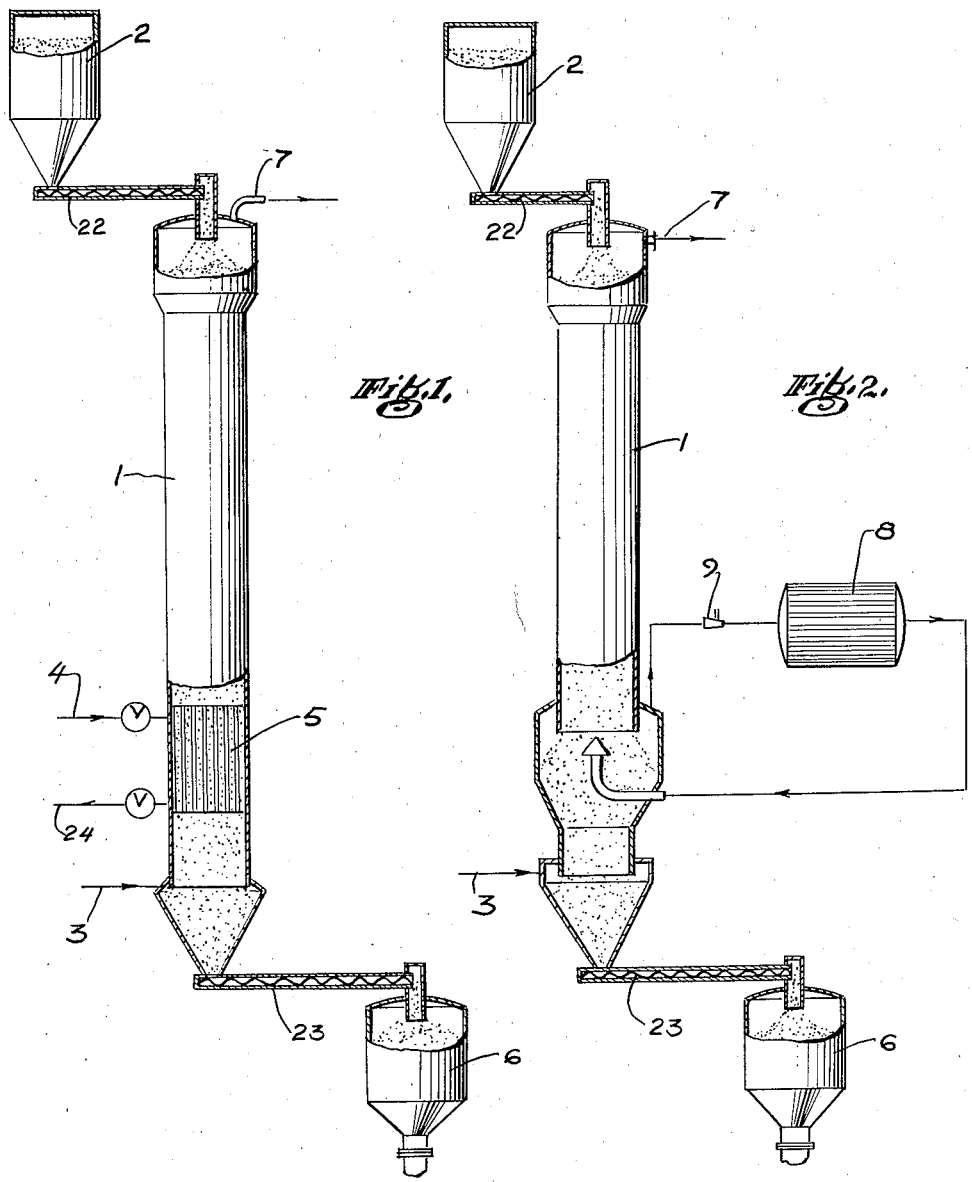
INVENTOR
Giulio Natta
BY Hammond + Littell
ATTORNEYS

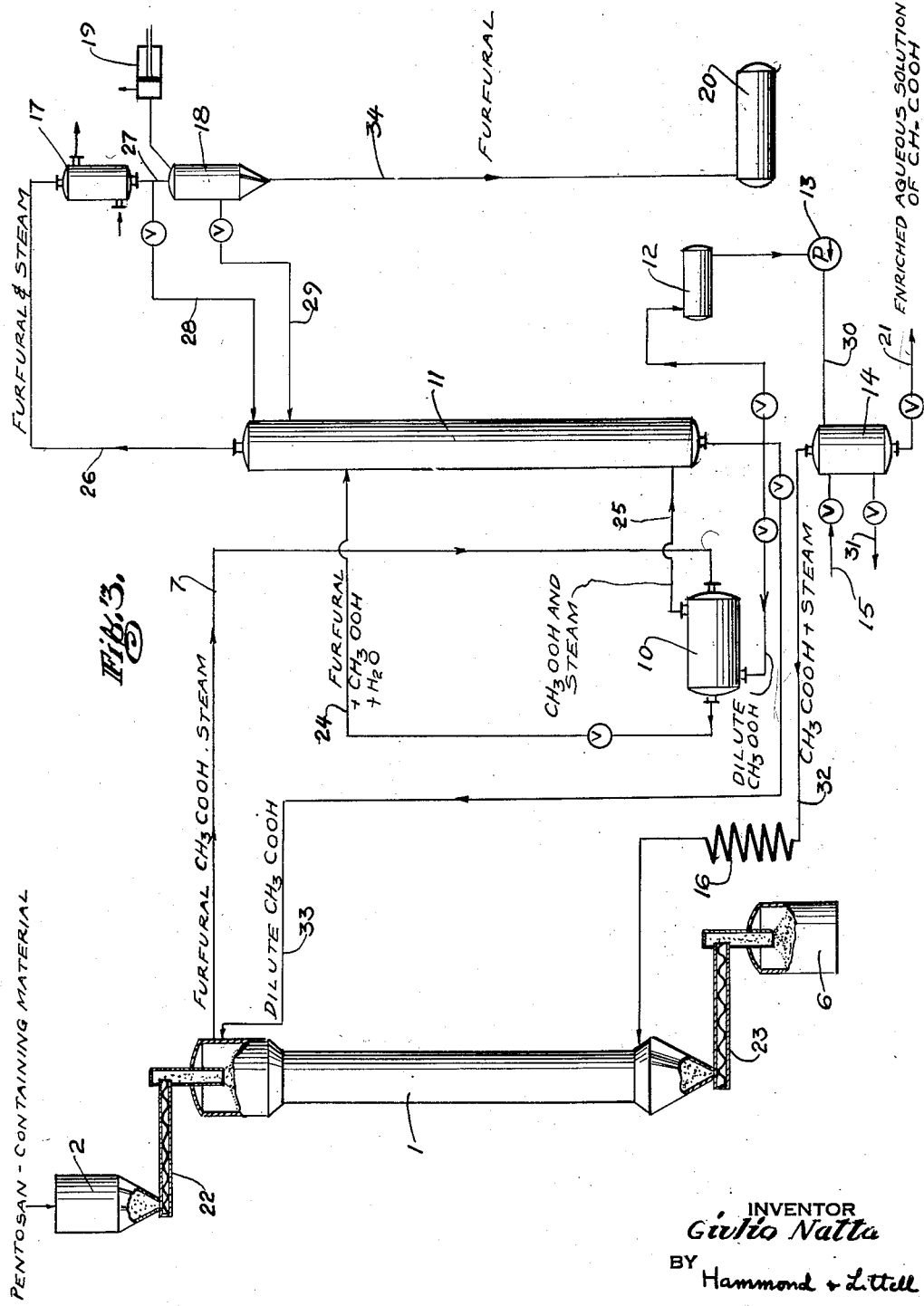

United States Patent Office 2,818,413
Patented Dec. 31, 1957

2,818,413

CONTINUOUS PROCESS FOR THE PRODUCTION OF FURFURAL AND ACETIC ACID FROM VEGETATIVE MATERIAL

Giulio Natta, Milan, Italy, assignor to Oronazio de Nora Impianti Elettrochimici, Milan, Italy, a corporation of Italy Application July 21, 1954, Serial No. 444,859

Claims priority, application Italy January 19, 1946

7 Claims. (Cl. 260—347.9)

This invention relates to an improved continuous process for the production of furfural and acetic acid from pentosan-containing vegetative materials, and more particularly to a process which makes it possible to produce economically attractive yields of both furfural and acetic acid simultaneously.

Various processes are known for the production of furfural from pentosan-containing vegetative material in which said material is treated with saturated or superheated steam in the presence of a mineral acid catalyst. Those processes of the prior art which have found their way into large-scale industrial use operate at pressures well above atmospheric pressure and are batch processes. However, continuous processes have also been disclosed, but they also operate at elevated pressures and, therefore, the feeding and discharge of large quantities of vegetative material into and from the reaction apparatus has presented serious problems and has necessarily increased the cost of such operations.

The mineral acid catalysts normally used are, among others, sulfuric acid and hydrochloric acid. While sulfuric acid is non-volatile and is not carried off in the vapors leaving the furfural extraction equipment, it is difficult to remove from the residual vegetative material and consequently makes the further use of this material difficult because of its highly corrosive character. Hydrochloric acid has been found to be a very effectve catalyst for the production of furfural from pentosan-containing vegetative material. However, like all halogen acids, it is rather volatile and escapes from the extraction apparatus with the furfural vapors. Hence, it must be constantly replenished in the extraction apparatus to maintain the proper concentration of mineral acid catalyst therein.

In order to obtain commercially attractive yields with hydrochloric acid as the catalyst, the concentration of acid must be maintained at a rather high level. Hence, the amount of acid required in those processes is high and increases the cost of the furfural produced. In addition, the furfural vapors issuing from the extraction equipment employing hydrochloric acid in accordance with the processes known to the prior art are highly corrosive because of their hydrochloric acid content, and special corrosion-resistant equipment is required to separate the furfural from the acid, thereby rendering the process still more costly.

In my co-pending application Ser. No. 223,032, filed April 26, 1951, now U. S. Patent 2,689,250 of which this application is a continuation-in-part, and which in turn is a continuation-in-part of applications Ser. No. 720,476, filed January 6, 1947 (now abandoned), and Ser. No. 766,889, filed August 6, 1947 (now abandoned), I have disclosed a process for the production of furfural and acetic acid from pentosan-containing vegetative material in the presence of hydrochloric acid as a catalyst. In said process the amount of hydrochloric acid in the furfural vapors is materially reduced, but not completely eliminated.

The ligneous compounds contained in the vegetative material commonly employed as the source of pentosan for the production of furfural by the above-described methods form a small amount of acetic acid under the conditions prevailing in the extraction apparatus. This acetic acid is removed with the furfural vapors and must be separated therefrom. In prior process, including that disclosed in the above U. S. Patent No. 2,689,250, the amounts of acetic acid in the furfural vapors have been so small that their recovery as a separate by-product has not been economical.

It is the primary object of this invention to provide a process whereby the hydrochloric acid employed as a catalyst in the production of furfural from pentosan-containing vegetative material is substantially prevented from leaving the extraction vessel with the furfural and acetic acid vapors, thereby making it unnecessary to constantly replenish the acid from outside sources.

Another object is to provide a process for the produition of furfural from pentosan-containing material wherein the acetic acid formed in the extraction apparatus and carried away with the furfural vapors can be effectively and economically removed in such concentrations as to make it a readily salable and commercially desirable by-product of the process.

Another object is to provide a process for producing furfural from pentosan-containing vegetative material in the presence of a hydrochloric acid catalyst with increased yields of furfural and acetic acid.

Still another object is to provide a process for the production of furfural which is economically more desirable than prior art processes.

Further objects and advantages will become apparent as the description of the invention proceeds.

In general, my improved process for the production of furfural comprises continuously feeding moist pentosan-containing vegetative material into the upper part of an extraction column, introducing steam into the lower part of the column, introducing hydrochloric acid into the column and building up a high hydrochloric acid concentration in a reflux zone intermediate the points of introduction of the steam and the pentosan-containing vegetative material, reducing the introduction of hydrochloric acid into the column, when the concentration thereof in the reflux zone has reached a value most favorable for the conversion of pentosan into furfural, to the amount just necessary to balance the losses of hydrochloric acid due to the alkalinity of the feed material, withdrawing a vapor mixture substantially free from hydrochloric acid and containing principally furfural, acetic acid and steam at the top of the column, and discharging residual vegetative material from the bottom of the column substantially dry and free from hydrochloric acid. It further comprises separating the acetic acid from the furfural to form an aqueous acetic acid solution, partly evaporating and recycling a portion of this solution into the extraction column in the form of a superheated steam-acetic acid vapor mixture, and continuously withdrawing the other part of this portion, concentrated by evaporation, from the cycle in the form of an enriched aqueous acetic acid solution. Finally, the process comprises separating the furfural from the steam and continuously withdrawing it from the cycle in a highly concentrated liquid form. The hydrochloric acid may be introduced at any point along the column, but it is preferably introduced during the starting period with the vegetative material and, after normal operating conditions are reached, into the lower part of the column.

The detailed steps of the process and its method of operation will be better understood when considered in conjunction with the drawings attached hereto which form a part of the specification. It is understood, however, that the drawings are intended to represent only one particular embodiment of my invention, which may be modified in various ways within the scope of the invention without departing from the spirit thereof.

In the drawings:

Fig. 1 is a schematic representation of an embodiment of an extraction column suitable for use in conjunction with the process.

Fig. 2 is a schematic representation of another embodiment of an extraction column suitable for use in carrying out my novel process.

Fig. 3 is an overall flow sheet of the process.

The furfural extraction apparatus shown schematically in Fig. 1 comprises an extraction column 1, a feed hopper 2, a discharge hopper 6, continuous feed means 22 for feeding material from hopper 2 into extraction column 1, continuous discharge means 23 for withdrawing material from extraction column 1 and feeding such material into hopper 6, a steam intake line 3, a heat exchanger 5 with fluid inlet 4 and outlet 24, and exhaust duct 7.

The method of operation of this extraction column is substantially similar to that described in the above U. S. Patent No. 2,689,250, namely as follows:

Pentosan-containing vegetative material is introduced into hopper 2 where it is moistened with water. Feed means 22—for example, a screw conveyor mechanism—transport the wet vegetative material into extraction column 1. Hydrochloric acid is introduced into the column. Superheated steam is introduced at the bottom of the column through steam line 3. The descending vegetative material meets the rising steam in countercurrent flow, whereby the pentosans are transformed into pentoses and finally into furfural. The hydrochloric acid necessary as a catalyst to cause this transformation to take place can be introduced in various ways. Thus, to start the operation of the column it is possible to introduce the acid together with the water used to wet the vegetative material; or the acid may be introduced into the column through a pipe located anywhere in the column. Similarly, the water required to wet the vegetative material can be introduced either wtih the material from hopper 2 or through a pipe located somewhere in the upper portion of the column. The material itself usually contains some moisture. The reaction in the column takes place most advantageously if the total water content of the material is somewhere between 20 and 30% by weight of dry material. Therefore, the water added should be so calculated that the total amount of water entering the column, including the moisture content of the material, lies between 20 and 30%.

As in the process disclosed in the above-mentioned copending application, the water, acid and material descending in countercurrent flow against the rising superheated steam cause the formation of a reflux zone in the mid-portion of the column. In this reflux zone the ascending vapors are continuously condensed by the cold materials descending from the top of the column, and then re-vaporized by the hot steam entering the bottom of the column to maintain a constant refluxing of liquid in the mid-portion of the column. The effect of this reflux is to cause the hydrochloric acid concentration to build up in the column to a point where a maximum yield of furfural can be obtained. While my prior process substantially reduced the amount of hydrochloric acid escaping with the furfural vapors, the present invention is particularly directed toward eliminating this loss of acid completely. This object is achieved primarily by introducing water at the top of the column in such large amounts as to strip all of the hydrochloric acid from the rising furfural vapors. The amount of water which will accomplish this purpose is about 20 to 30% by weight of dry material, including the moisture of the vegetative material.

A further aid in accomplishing this end is the provision of a heat exchanger 5 below the reflux zone. This heat exchanger aids the superheated steam rising through the column in stripping any hydrochloric acid contained in the vegetative material which has passed through the reflux zone, and in returning the acid to the reflux zone. The combined effect of the superheated steam and the heat exchanger 5 also insure that the material discharged from the column into hopper 6 is completely dry and free from acid, so that the refuse from the extraction column can be advantageously and safely used for heating the steam boilers without danger of corrosion.

The provision of a heat exchanger is particularly desirable when the pentosan-containing vegetative material is relatively free-flowing and heavy, such as, for example, olive husks. Such material has a tendency to form tars under the action of excessive heat which clog the column and decrease thermal efficiency of the column. In order to prevent such tar formation, the heat exchanger 5 is maintained at a temperature which will prevent such tar formation. In the event the vegetative material is light and rather porous, such as rice hulls and the like, it is better to maintain the heat exchanger 5 at a higher temperature by any suitable means. However, light, porous vegetative materials are preferably treated in direct contact with superheated steam. Therefore, with those materials it is possible to omit the auxiliary heat exchanger 5 and rely entirely on the effect of the rising superheated steam. In order to rid the refuse of all hydrochloric acid and to completely dry it prior to its discharge into hopper 6 without the aid of the auxiliary heat exchanger, it is necessary to increase the amount of superheated steam entering through pipe 3.

For the purpose of reducing steam consumption and yet obtain an acid-free and dry waste material at the bottom of the column when treating porous vegetative material, I prefer to use the extraction column shown in Fig. 2. This column is constructed substantially the same as in Fig. 1, with the exception that it does not contain an auxiliary heat exchanger. Instead, it comprises means for withdrawing a portion of the ascending steam from the column below the reflux zone and passing that portion of the steam through a heat exchanger 8 where it is again superheated. This superheated steam is then returned to the lower portion of the extraction column. The steam is withdrawn from the column as above described by an aspirating device or ejector 9 operated by steam at a pressure considerably higher than that prevailing in the column. It is obvious that the arrangement of Fig. 2 affords a saving of steam.

Thus, the above-described process is capable of producing high yields of furfural without any appreciable removal of hydrochloric acid in the overhead vapor stream. Some small amounts of acid must be added to the column because the vegetative material contains a small amount of alkaline substances which will be neutralized by the acid under the reaction conditions and leave the column with the refuse. However, the amount of acid consumed in this manner is so small that it may be replaced in small quantities. This process differs from the process of my prior U. S. Patent No. 2,689,250 in that the vegetative material passes through the extraction column countercurrent to superheated steam but concurrent with a flow of liquid in such greater quantities that all of the hydrochloric acid contained in the vapors emerging from the reflux zone is absorbed in that liquid and returned to the reflux zone.

However, the above differentiation of my present process over the prior art is only a partial differentiation, as will become apparent from the following disclosure.

The ligneous material which forms a part of the vegetative materials commonly used for the production of furfural produces small amounts of acetic acid during the above-described extraction process. The acetic acid thus formed is carried out of the extraction column with the furfural vapors and steam. The amount of acetic acid contained in the discharge vapors of the extraction column is so small that the separation thereof is not ordinarily economically feasible.

I have found that, by separating the acetic acid from the furfural and steam in a rectifying column and recycling a portion of the acetic acid so separated into the extraction column, it is possible to build up the amount of acetic acid in the vapors and recover an enriched aqueous solution of acetic acid from the cycle without affecting the extraction of furfural. By returning a portion of the separated acetic acid solution into the extraction column, either with the superheated steam or with the water or through both means, the formation of higher acid concentration in the column is possible. In the prior art processes, the maximum acetic acid content of the furfural vapors attained is from 1 to 2%. However, by my process it is possible to increase the acetic acid content to 12%, or even more, depending upon the amount of ligneous components in the vegetative pentosan-containing material processed.

The method of recovering acetic acid from the furfural extraction process will be described in connection with Fig. 3 of the drawings. This figure shows a schematic arrangement of the equipment used to make the recovery of acetic acid economically feasible. In addition to the furfural extraction column 1, hoppers 2 and 6 and continuous feeding and discharge means 22 and 23, as previously described, the equipment includes a heat exchanger 10, a rectifying column 11, an acetic acid storage tank 12, a pump 13, an evaporator 14, a superheater 16, a condenser 17, a liquid phase separator 18, a vacuum pump 19, and a furfural storage tank 20.

In operation, the above equipment, interconnected by appropriate fluid flow lines, functions as follows:

The pentosan-containing vegetative material is fed from hopper 2 into extraction column 1, where, under the action of steam and hydrochloric acid, the pentosan is successively converted into pentose and then into furfural, and a certain amount of acetic acid is recovered from the ligneous components. The vapors leaving the extraction column consist largely of furfural, acetic acid and steam, and are completely free from hydrochloric acid. This vapor mixture leaves the extraction column through line 7 and goes to shell and tube heat exchanger 10, where it is substantially condensed by a transverse flow of hot dilute acetic acid emerging from the bottom of rectifying column 11. The condensed mixture of furfural, acetic acid and water leaves the heat exchanger 10 through line 24, which leads to the upper portion of rectifying column 11. In heat exchanger 10 dilute acetic acid from the rectifying column 11 is vaporized by the hot vapors fed in through line 7 and acetic acid vapors are fed back into the lower portion of rectifying column 11 through line 25. The vapors rising in column 11 meet the liquid descending, thus creating a reflux action which has the effect of enriching the liquid flowing out of the bottom of the column in acetic acid content, while at the same time stripping the furfural and some of the steam from the condensed liquid mixture entering the column through line 24.

The furfural and steam leave column 11 through line 26 in vapor form and pass into condenser 17, and from there through line 27 into separator 18. Pump 19 provides a vacuum within column 11 and separator 18. Of the two layers separating in separator 18, the layer rich in furfural is then withdrawn from separator 18 through line 34 into storage tank 20. Some of the condensed furfural-water mixture flowing through line 27 may be withdrawn therefrom and introduced as reflux into the top of column 11 through line 28, and all of the aqueous layer from separator 18 is introduced as reflux into column 11, depending on the conditions prevailing in the column.

The liquid withdrawn from the bottom of column 11, which consists of moderately dilute acetic acid, is partially fed into heat exchanger 10. Another portion may be recycled into the extraction column 1 through line 33. The remaining portion is channeled into storage tank 12. Pump 13 pumps the acetic acid solution from tank 12 into evaporator 14 through line 30. Steam is fed into the evaporator through line 15 and the condensate leaves through line 31. In evaporator 14, a portion of the dilute acetic acid solution entering through line 30 is vaporized and leaves the evaporator at the top through line 32, whence it passes through a superheater 16 back into extraction column 1, which causes the vapors leaving column 1 to be enriched in acetic acid, while simultaneously furnishing the steam for the conversion of pentose to furfural and the formation of more acetic acid from the ligneous components of the vegetative material. An enriched solution of acetic acid, containing up to 12% acetic acid, and more, depending upon the amount of ligneous components in the original vegetative material, is withdrawn from the bottom of evaporator 14. This enriched solution can be economically converted into commercial acetic acid.

The extraction column 1 must be tall enough to effect the component exchange between the steam phase and the liquid phase, even if the vegetative material is of irregular size. In general, the most effective height of the extraction column has been found to be 6 meters or a little more. However, if the vegetative material from which the furfural is to be extracted is of uniform granular composition, the height of the column can be reduced without sacrificing any of the efficiency of the process.

While the drawings show the extraction column 1 to be a vertical column, it may also be substituted by an inclined or horizontal column in which the vegetative material is moved through the column in countercurrent relationship to the steam by mechanical means rather than by gravity. Other modifications may readily be made in the equipment and process within the scope of the disclosure and the claims without departing from the spirit of the invention.

It is also possible to substitute chlorine for the hydrochloric acid in the process. In this case the chlorine is introduced into column 1 at a point slightly above the discharge end for the extracted vegetative material or with the superheated steam. As the chlorine rises in the column it is converted into hydrochloric acid.

My process is also adapted for the extraction of furfural in good commercial yields from vegetative material which is poor in pentosans and cannot economically be used in existing equipment and processes.

The following examples are given for the purpose of further illustrating my invention and without limiting my invention thereto.

*Example I*

A glass column, 6 cm. in diameter and 2 m. high, is used as the extraction column. It is insulated against heat loss with an insulating coating. The external surface of this coating is maintained at slightly more than 100° C. by an electric resistance heater in order to further insure against thermal leakages. To start the extraction process the column is filled with rice hulls soaked in 5% by weight of HCl using a 20% solution of hydrochloric acid in water, and steam is introduced at the bottom at the rate of 280 gm./hr., superheated to 300° C. The flow of vegetative material is maintained by feeding rice hulls impregnated with 5% by weight of HCl using a 20% aqueous hydrochloric acid solution at the rate of 100 gm./hr. into the top of the column, while discharging the spent, dry, acid-free refuse at the bottom.

These conditions are maintained for about 24 hours to permit the formation of the vigorously hydrolyzing hydrochloric acid concentration in the reflux zone. At the end of this starting period, during which the conditions in the column are built up to reach smooth operating conditions and optimum furfural extraction, the rice hulls fed into the top of the column need not be soaked in a hydrochloric acid solution any longer, but only in water in an amount sufficient to maintain the weight of total moisture entering the column with the rice hulls at 25% based on the weight of dry rice hulls. By this time the acid concentration in the reflux zone has been sufficiently built up and is maintained at that point by the reflux action of the descending liquid and the ascending steam. In order to compensate for the small loss of hydrochloric acid due to neutralization of alkaline components in the rice hulls, 0.7 gm. of hydrochloric acid per 100 gm. of dry vegetative material are mixed with the superheated steam fed in through the bottom. The furfural-acetic acid-water vapors leaving the extraction column are practically free from hydrochloric acid. The yield of furfural is 9% by weight based on the dry rice hulls, which is about 75% of the theoretical yield, and can be increased to about 10% by increasing the amount of steam introduced into the column. The amount of acetic acid produced is about 3% by weight of the dry rice hulls and does not represent a quantity which can be economically recovered by ordinary commercial means.

Example II

An extraction column as in Example I is filled with rice hulls impregnated with 5% by weight of HCl using a 25% aqueous solution of hydrochloric acid, while introducing 250 gm./hr. of steam superheated to 300° C. The flow of rice hulls is maintained at the rate of 100 gm./hr., while the dry, acid-free spent refuse is withdrawn at the bottom at the rate of about 75 gm./hr. These conditions are continued for about 24 hours until the column reaches normal operating conditions. After this initial starting period, during which the hydrochloric acid concentration in the reflux zone is built up to give optimum conditions for the conversion of pentosan to furfural, the rice hulls continue to be fed into the column at the rate of 100 gm./hr., but are impregnated only with 15% by weight of an aqueous acetic acid solution, which is withdrawn from the bottom of a rectifying column, such as column 11, in which the hydrochloric acid-free furfural vapors issuing from the extraction column are separated from the acetic acid vapors admixed therewith. The aqueous solution of acetic acid necessary for the impregnation of the rice hulls represents only a portion of the total acid solution withdrawn from the rectifying column 11; the remainder is fed into an evaporator at the rate of about 265 gm./hr. In the evaporator, part of the water and acid is evaporated to form steam containing a certain amount of acetic acid, which is then superheated to about 300° C. and returned to the extraction column after adding about 1 gm./hr. of hydrochloric acid to make up for the losses due to alkalinity of the vegetative material. The enriched remainder of the acetic acid solution in the evaporator, such as 14, is withdrawn therefrom at the rate of about 14 gm./hr. At the end of 40 hours the solution extracted from the evaporator reaches a concentration of about 10.4% by weight of acetic acid and it can then be used to produce commercial acetic acid by any one of a number of known processes. The furfural vapors withdrawn from the top of the rectifying column 11 are passed into a condenser and then into a separator where the water layer is removed and recycled as a reflux into the top of the rectifying column. The yield of furfural recovered is about 9% by weight based on the weight of dry rice hulls entering the extraction column.

While I have illustrated certain preferred embodiments of my invention, it will be understood, as heretofore stated, that various modifications and changes can be made without departing from the spirit of my invention or the scope of the following claims.

I claim:
1. A continuous process for simultaneously producing furfural and acetic acid from pentosan-containing material in the presence of hydrochloric acid as a catalyst, which comprises continuously feeding unheated pentosan-containing material and water into the top of a column having a top, a bottom and an intermediate zone whereby they descend through said column to the bottom thereof, introducing hydrochloric acid into said column, vaporizing the water and hydrochloric acid at the bottom of the column by means of superheated steam introduced into the column at the bottom thereof, thereby producing in the liquid phase of the material descending through the column at a point above that at which vaporization of the water and hydrochloric acid takes place a rectifying effect by the passage of acid vapors through said descending material, said rectifying effect being due to the partial condensation of the hydrochloric acid vapors by the water contained in the cold material entering at the top of the column and to the fact that the descending material always has a lower temperature than the ascending vapors, whereby the acid concentration in the liquid phase reaches a maximum in a reflux zone intermediate the top and the bottom of the column, said reflux zone constituting a zone of maximum hydrolysis of said pentosan-containing material, the amount of water introduced being sufficient to remove substantially all of the hydrochloric acid from the ascending vapors above said reflux zone and to return said acid so removed to said reflux zone, withdrawing the resultant gaseous products containing furfural, acetic acid and steam from the top of the column, continuously discharging spent material, dried and free from acid, from the bottom of said column, said superheated steam being introduced into the bottom of said column in an amount and at a temperature sufficient to remove substantially all of the hydrochloric acid contained in the spent material emerging from said reflux zone and to return the hydrochloric acid so removed to the reflux zone, reducing the introduction of hydrochloric acid into the column when the concentration thereof in the reflux zone has reached a value most favorable for the conversion of pentosan into furfural to the amount just necessary to balance the losses of hydrochloric acid due to the alkalinity of the feed material, continuously separating the vapors issuing from said column to produce a dilute aqueous solution of furfural and dilute aqueous solution of acetic acid, rectifying said furfural solution to produce substantially concentrated furfural, returning a portion of said solution of acetic acid into said column, whereby the vapors issuing from said column are enriched in acetic acid content, and continuously concentrating the remainder of said dilute acetic acid solution to produce commercial acetic acid.

2. The method of continuously and simultaneously producing furfural and acetic acid which comprises introducing moist furfural and acetic acid-yielding plant material into the top of a distilling column having a top, a bottom and an intermediate section, introducing a hydrogen chloride-containing catalyst into said furfural- and acetic acid-yielding plant material in said distilling column, continuously introducing superheated steam into the bottom of said column at a temperature and in sufficient volume to distill the furfural, water and acetic acid from said furfural- and acetic acid-yielding plant material, passing the volatilized furfural, water and acetic acid into contact with the colder upper layers of said furfural- and acetic acid-yielding plant material to condense and return substantially all of said catalyst and a portion of the other volatilized material into the mid-portion of the column, continuously removing uncondensed steam, furfural and acetic acid from the top of said column, continuously removing spent, catalyst-free, plant material from the bottom of said column below the steam inlet, continuously separating the acetic acid vapors from the furfural vapors, evaporating a portion of the acetic acid and introducing the evaporated fraction into the bottom of the column together with the superheated steam, continuously recovering acetic acid from the remaining enriched fraction of acetic acid, and continuously condensing and concentrating the acid-free furfural vapors.

3. The method of continuously and simultaneously producing furfural and acetic acid which comprises introducing moist furfural- and acetic acid-yielding plant material into the top of a distilling column having a top, a bottom and an intermediate section, introducing a hydrogen chloride-containing catalyst into said furfural- and acetic acid-yielding plant material in said distilling column, continuously introducing superheated steam into the bottom of said column at a temperature and in sufficient volume to distill the furfural, water and acetic acid from said furfural- and acetic acid-yielding plant material, passing the volatilized furfural, water and acetic acid into contact with the colder upper layers of said furfural- and acetic acid-yielding plant material to condense and return substantially all of said catalyst and a portion of the other volatilized material into the midportion of the column, continuously removing uncondensed steam, furfural and acetic acid from the top of said column, continuously separating the acetic acid vapors from the furfural vapors, recycling a first portion of the acetic acid into the top of the column, partially evaporating a second portion of the acetic acid and introducing the evaporated fraction into the bottom of the column together with the superheated steam, continuously recovering acetic acid from the remaining enriched fraction of acetic acid, and continuously condensing and concentrating the acid-free furfural vapors.

4. The method of continuously and simultaneously producing furfural and acetic acid which comprises introducing furfural- and acetic acid-yielding plant material together with water and a hydrochloric acid-containing catalyst into the top of a distilling column having a top, a bottom and an intermediate section, continuously introducing superheated steam into the bottom of said column at a temperature and in sufficient volume to distill the furfural, water, acetic acid and catalyst from said plant material, contacting the volatilized products with the colder upper layers of the said plant material and said water and cold catalyst to condense and return substantially all of said volatilized catalyst to the mid-portion of the column whereby the concentration of catalyst in said midportion of the column constantly increases, continuously removing uncondensed steam, furfural and acetic acid from the top of said column, continuously removing catalyst-free, dry, spent plant material from the bottom of said column below the steam inlet, continuously separating the acetic acid vapors from the furfural vapors, recycling a portion of the recovered acetic acid solution separated from the furfural into the column, continuously recovering acetic acid from the remaining enriched fraction of acetic acid, and continuously condensing and concentrating the acid-free furfural vapors.

5. The method of continuously and simultaneously producing furfural and acetic acid as in claim 2, which comprises the additional step of heating the spent plant material by indirect contact with a fluid having a boiling point of not more than 150° C. prior to discharging said spent material from said column.

6. The method of continuously and simultaneously producing furfural and acetic acid as in claim 2, which comprises the additional step of withdrawing a portion of the steam above the place at which it is introduced into the column, re-superheating said portion and reintroducing said re-superheated portion into the column at a point below its withdrawal from the column and above the superheated steam inlet.

7. The method of continuously and simultaneously producing furfural and acetic acid which comprises continuously introducing furfural- and acetic acid-yielding plant material together with water into the top of a distilling column having a top, a bottom and an intermediate section, continuously introducing superheated steam, at a temperature and in sufficient volume to distill the furfural, water and acetic acid from said plant material, and chlorine into the bottom of the column, passing the hydrochloric acid formed by reaction of chlorine with water and said plant material, the volatilized furfural, water and acetic acid into contact with the colder upper layers of said plant material and water to condense and return substantially all of the volatilized hydrochloric acid and a portion of the other volatilized materials into a midportion of said column whereby the concentration of hydrochloric acid in said mid-portion of the column constantly increases, continuously removing uncondensed steam, furfural and acetic acid from the top of said column, continuously removing chlorine and acid-free, spent plant material from the bottom of said column below the steam inlet, reducing the introduction of chlorine into the column when the concentration of hydrochloric acid reaches a predetermined optimum value to the amount just necessary to balance the losses of hydrochloric acid due to the alkalinity of the feed material, continuously separating the acetic acid vapors from the furfural vapors, recycling a portion of the acetic acid separated from the furfural into the column, continuously recovering acetic acid from the remaining enriched fraction of acetic acid, and continuously condensing and concentrating the acid-free furfural vapors.

References Cited in the file of this patent

UNITED STATES PATENTS

| | | |
|---|---|---|
| 1,322,054 | Ricard | Nov. 18, 1919 |
| 2,140,572 | Brownles | Dec. 30, 1938 |
| 2,436,804 | Hill | Mar. 2, 1948 |
| 2,689,250 | Natta | Sept. 14, 1954 |

UNITED STATES PATENT OFFICE

CERTIFICATE OF CORRECTION

Patent No. 2,818,413 December 31, 1957

Giulio Natta

It is hereby certified that error appears in the above numbered patent requiring correction and that the said Letters Patent should read as corrected below.

In the grant, lines 2 and 12, and in the heading to the printed specification, lines 5 and 6, name of assignee, for "Oronazio de Nora Impianti Elettrochimici", each occurrence, read -- Oronzio de Nora Impianti Elettrochimici --; column 2, line 20, for "produition" read -- production --; column 8, line 48, for "and dilute" read -- and a dilute --.

Signed and sealed this 25th day of March 1958.

(SEAL)
Attest:

KARL H. AXLINE
Attesting Officer

ROBERT C. WATSON
Commissioner of Patents